United States Patent [19]
Khanna et al.

[11] Patent Number: 5,640,290
[45] Date of Patent: Jun. 17, 1997

[54] SHOCK-RESISTANT STRUCTURE FOR MAGNETIC DISK DRIVE

[75] Inventors: Vijayeshwar Khanna, Ossining, N.Y.; Ichiroh Koyanagi, Yokohama, Japan; Suresh Kumar, Peekskill, N.Y.; Hiroshi Matsuda, Zama, Japan; Muthuthamby Sri-Jayantha, Ossining, N.Y.

[73] Assignee: International Business Machines Corporation, Armonk, N.Y.

[21] Appl. No.: 531,494

[22] Filed: Sep. 21, 1995

[30] Foreign Application Priority Data

Sep. 27, 1994 [JP] Japan .................. 6-231918

[51] Int. Cl.$^6$ ........................... G11B 21/21
[52] U.S. Cl. ........................... 360/105; 360/97.01
[58] Field of Search ................ 360/97.01, 97.02, 360/97.03, 105, 128, 104, 129, 98.01

[56] References Cited
FOREIGN PATENT DOCUMENTS
3-168985  7/1991  Japan .

*Primary Examiner*—Stuart S. Levy
*Assistant Examiner*—William J. Klimowicz
*Attorney, Agent, or Firm*—Baker, Maxham, Jester & Meador

[57] ABSTRACT

When an HDD is subjected to shock with a magnetic head (22) retracted to the parking zone, a suspension (34) having a magnetic head (36) at the free end thereof swings. When a lowest suspension (34) swings, the free end of the suspension (34) is brought into contact with a pin projection (50) and further displacement toward the base (12) is impeded. The suspension (34) that further swings in this condition presents not a swing in a primary mode (cantilever support mode) but a swing in a secondary mode (two-point support mode), and the maximum displacement of the suspension (34) occurs at the longitudinal intermediate portion of the suspension (34). The intermediate portion that is displaced is made to go into a groove (48), and the contact of the intermediate portion of the suspension (34) with the base (12) is impeded by the groove (48).

18 Claims, 5 Drawing Sheets

SHOCK-RESISTANT STRUCTURE FOR MAGNETIC DISK DRIVE

BACKGROUND OF THE INVENTION

1. Field of the Invention

The present invention relates to the shock-resistant structure for a magnetic disk drive such as a hard disk drive (HDD).

2. Description of the Related Art

In the hard disk drive (HDD), a magnetic disk is enclosed in an enclosure case comprising a base closed by a cover, and driven to rotate by a spindle motor provided in the base. A carriage with a magnetic head is also provided within the enclosure case and freely rotatable and supported through a pivot on the base. The carriage is rotated by an actuator using a voice coil motor (VCM) so that the magnetic head can be positioned over the magnetic disk to perform reading and the like of the magnetic information of the magnetic disk. The carriage is provided with a cantilever suspension having the above-described magnetic head installed on the free end thereof. The suspension is formed into a plate shape so as to be elastically deformable and urges the magnetic head against the magnetic disk. During normal rotation of the magnetic head, the magnetic head floats against the elastic force of the suspension over the magnetic disk. When the rotation of the magnetic disk is stopped or the reading and the like of the magnetic information is not performed, the magnetic head is retracted to the inner peripheral side (parking zone) of the magnetic disk.

Incidentally, on the one hand, the HDD is required to be thin. Since the base is provided with the spindle motor and supports the head arm, it needs thickness to ensure the suitable strength for supporting them. It is therefore preferable that the clearance between the suspension and base be minimized. On the other hand, a portable computer is frequently moved. When it is being moved, it is predictable that the HDD is subjected to shock. Even if the magnetic head were retracted to the parking zone, the above-described suspension has a vibration system such as that shown in FIG. 9, and the magnetic head would swing if the HDD is subjected to shock. The maximum displacement is obtained from Equation (1).

$$\sigma_{max} = \ddot{X}_{max}/\omega_n^2 \quad (1)$$

where $\sigma_{max}$: maximum displacement, $\ddot{X}_{max} = f(\omega_n \cdot \tau_r) \cdot \ddot{X}_{0max}$, $$\omega_n = \sqrt{\frac{K}{m}}$$

$K = f(K_1, K_2, K_3)$, $m_1$: magnetic head equivalent mass, $m_2$: suspension equivalent mass, $\ddot{X}_0$: input acceleration, $$\tau_r = \frac{2}{\pi} \text{ (sine semi-wave)},$$

$\tau = 0.5$ to 2 ms, $K_1$ = spring constant on the side on which the proximal end of a suspension is supported, $K_2$ = spring constant of suspension, and $K_3$ = spring constant on the side on which a magnetic disk is supported.

The displacement produced as the suspension is subjected, for example, to an acceleration equivalent to 500 G is shown in FIG. 10. According to this, the longitudinal intermediate portion of the suspension is within a range of 0.5 mm and does not contact with the base, but the free end of the suspension on which the magnetic disk is installed exceeds 0.5 mm and assumes the maximum displacement. The clearance between the suspension in a stationary state (indicated by the solid line) and the base should be minimized as described above. The free end of the suspension crashes against the base under a large acceleration. This crash often destroys the magnetic head. It is also conceivable that the free end of the suspension rebounds due to the reaction of the crash and therefore the acceleration as the magnetic head crashes against the magnetic disk becomes large.

It is conceivable to form a groove 106 in a base 104 between the free end of a suspension 102 and the base 104, as shown in FIG. 11. In the figure, reference numeral 108 denotes a magnetic head. According to this, the contact of the free end of the suspension 102 with the base 104 can be avoided (the stationary state of the suspension 102 is indicated by the solid line and the swing thereof is indicated by the broken line), but, if the displacement becomes large, the magnetic head and the magnetic disk will be damaged because of acceleration.

SUMMARY OF THE INVENTION

The present invention takes the above-described facts into consideration and has the object of providing a shock-resistant structure for a magnetic disk drive by means of which damage to the magnetic head and the magnetic disk is eliminated by controlling the swing of the suspension resulting from shock and by means of which thinning of the magnetic disk can also be ensured.

To solve the above problems, a shock-resistant structure for a magnetic disk drive is provided which includes an enclosure formed by a base closed by a cover, a magnetic disk which is driven to rotate by a motor provided on the base being enclosed in said enclosure; a carriage provided in the enclosure, the carriage including a support section freely movable and supported on the base, a suspension whose proximal end is cantilevered by the support section so as to be elastically deformable and which extends between the base and a magnetic disk, and a magnetic head which is provided on the free end of the suspension and urged toward the magnetic disk by the elasticity of the suspension and positioned by the movement of the support section so that it can perform reading and the like of magnetic information; a limiter section formed in a parking zone to which the magnetic head is retracted and extending toward the suspension, and, when the magnetic head is subjected to shock in the parking zone, the free end of the suspension displaced by a swing of the suspension resulting from the shock being brought into contact with the limiter section, and further displacement of the free end toward the base being impeded by the limiter section; and a groove formed in the parking zone, a longitudinal intermediate portion of the suspension which is displaced toward the base when the free end of the suspension contacts the limiter by the swing of the suspension resulting from the shock being prevented from being brought into contact with the base by the groove.

A shock-resistant structure for a magnetic disk drive of the present invention also includes an enclosure including a base closed by a cover, a magnetic disk which is driven to rotate by a motor provided on the base being enclosed in the enclosure; a carriage provided in said enclosure, the carriage including a support section freely movable and supported on the base, a suspension whose proximal end is cantilevered by the support section so as to be elastically deformable and which extends between the base and a magnetic disk, and a magnetic head which is provided on the free end of the suspension and urged toward said magnetic disk by the elasticity of the suspension and positioned by the movement of the support section so that it can perform reading and the like of magnetic information; and a limiter section formed in a parking zone to which the magnetic head is retracted, a portion extending between the free end and a longitudinal intermediate portion of the suspension which are displaced by a swing of the suspension resulting from the shock being contacted at least at opposite ends thereof by the limiter section, and further displacements of the contacted portions toward the base being impeded by the limiter section.

It is to be noted that the reading and the like of magnetic information includes any one or a combination of reading, writing, erasing, and the like of magnetic information.

According to the construction of this invention, if a suspension swings when a magnetic disk drive is subjected to shock with a magnetic head retraced to the parking zone, the tree end of the suspension will be brought into contact with the limiter section and further displacement of the free end toward the base will be impeded. The maximum displacement of the suspension that further swings in this condition occurs at the longitudinal intermediate portion of the suspension. The intermediate portion at which the maximum displacement occurs is made to go into a groove, and the contact of the intermediate portion of the suspension with the base is impeded by the groove. If there is no groove, the intermediate portion of the suspension will crash against the base and a greater acceleration will occur in the magnetic head because of the reaction force of the crash, so that the effect of the limiter section is to be reduced. This is prevented according to the present invention.

Also, since the free end of the suspension is brought into contact with the limiter section and further displacement of the free end toward the base is impeded, the acceleration of the free end of the suspension 34 (see FIG. 6B) on which the magnetic head 36 is installed is suppressed and therefore damage to the magnetic head and the magnetic disk is prevented. Further, the maximum displacement, which occurs at the intermediate portion of the suspension with the free end of the suspension brought into contact with the limiter section, is smaller than the maximum displacement which occurs at the free end of the suspension by the swing of the suspension produced when there is no limiter section, and therefore a shallow groove is sufficient. For the base needing a suitable strength for installing a spindle motor and supporting a carriage, this is effective in promoting the thinning of an HDD, while ensuring the strength of the base. Thus, damage to the magnetic head and the magnetic disk can be eliminated by controlling the swing of the suspension resulting from shock and, at the same time, thinning of the magnetic disk drive can also be ensured.

In addition, according to the structure that there is provided a limiter section which contacts with a portion extending between the free end and the longitudinal intermediate portion of a suspension, as shown in FIG. 8, at least the opposite ends of the extended portion, and which impedes further displacement of the contacted portions toward the base (the limiter section includes a pair of spaced limiter sections which are opposed to the intermediate portion and the free end of the suspension and a limiter section continuously formed over a portion extending between the free end and the longitudinal intermediate portion of the suspension), if the suspension swings when a magnetic disk drive is subjected to shock with a magnetic head retraced to the parking zone, the free end of the suspension will be brought into contact with the limiter section and further displacement of the free end toward the base will be impeded, and, at the same time, the intermediate portion of the suspension will also be limited and further displacement of the intermediate portion of the suspension toward the base will be limited and, overall, the acceleration of the suspension is suppressed. In such a case, without providing a groove in the base, damage to the magnetic head and the magnetic disk can be eliminated by controlling the swing of the suspension resulting from shock and, at the same time, thinning of the magnetic disk drive can also be ensured.

An object of the invention is to eliminate damage to the magnetic head and the magnetic disk by controlling the swing of a suspension resulting from shock and to ensure thinning of the magnetic disk drive.

DESCRIPTION OF THE PREFERRED EMBODIMENTS

A first embodiment of a shock-resistant structure for a magnetic disk drive according to the present invention will be described based on FIGS. 1 through 6 with reference to a hard disk drive (HDD).

Figure 1:
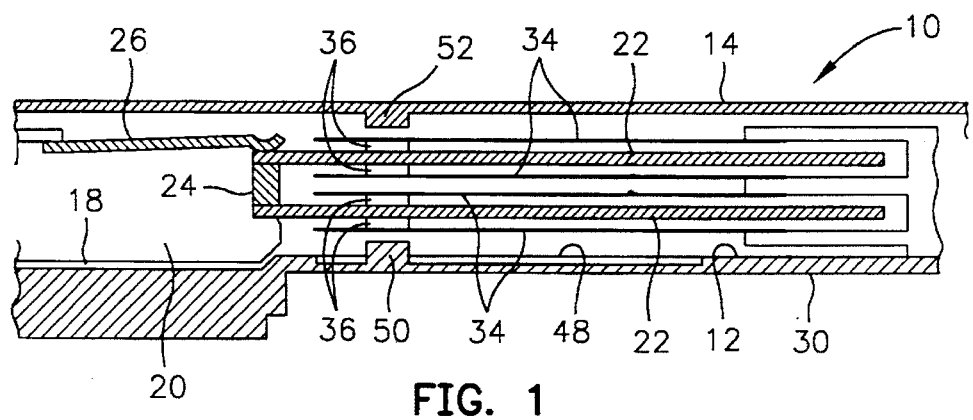
FIG. 1 is a longitudinal sectional view showing the essential portion of a hard disk drive to which a first embodiment of a shock-resistant structure for a magnetic disk drive according to the present invention is applied.
Figure 2:
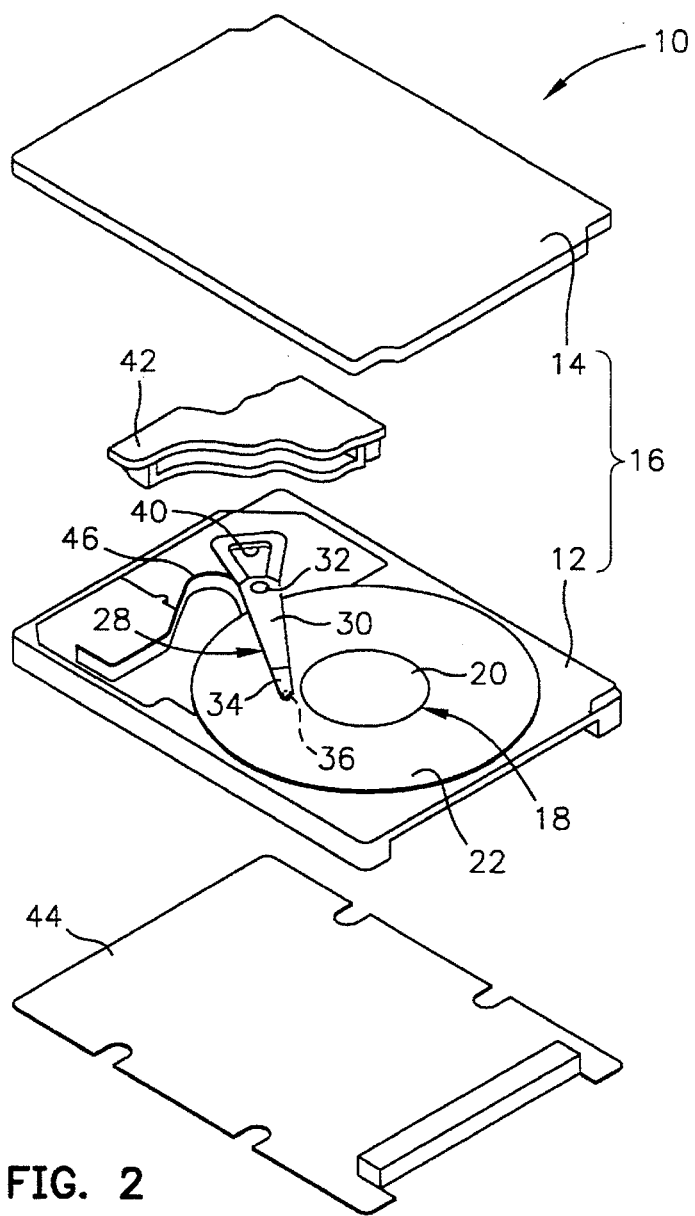
FIG. 2 is an exploded perspective view showing the hard disk drive in the first embodiment.

As shown in FIG. 2, a hard disk drive 10 as a magnetic disk drive comprises an enclosure case 16 including a shallow-bottomed base 12 whose upper open portion is closed with a cover 14. The enclosure case 16 is formed into a thin rectangular shape and disposed horizontally in a computer (not shown). Within the enclosure case 16, a hub-in structure spindle motor 18 is provided in the base 12. On the outer periphery of a hub 20 of the spindle motor 18, magnetic disks 22 are installed which are driven to rotate by the spindle motor 18. As shown in FIG. 1, the magnetic disks 22 are spaced on the same axis with a spacer 24 and pressed down to be held in place by means of a clamp 26 provided on the hub 20.

A carriage 28 is also provided within the enclosure case 16. In the carriage 28, one end of an arm 30 constituting a support section is freely rotatable and supported through a pivot 32 on the base 12. As shown in FIG. 1, the arm 30 is formed into a comb shape and four plate-shaped suspensions 34 are attached to the other end of the arm. Among the four suspensions 34, the uppermost suspension 34 extends between the upper one 22 of the two magnetic disks 22 and the cover 14, the lowermost suspension 34 extends between the lower magnetic disk 22 and the base 12, and the two intermediate suspensions 34 extend between the two magnetic disks 22. The proximal end of each of the suspensions 34 is cantilevered by the arm 30, and the free end has the magnetic head 36 installed thereon so that the magnetic head 36 is opposed to the surface of the magnetic disk 22. The suspension 34 is elastically deformable and urges the magnetic head 36 onto the magnetic disk 22. During normal rotation of the magnetic disk 22, the magnetic head 36 floats off the magnetic disk 22 against the urging force of the suspension 34 by an air stream resulting from the rotation of the magnetic disk 22, without contacting the magnetic disk 22. When the magnetic disk 22 is stopped or reading and the like of the magnetic information is not performed, the magnetic head 36 is retracted to the parking zone 38 on the inner peripheral side of the magnetic disk 22 which may be contacted by the head 36.

The arm 30 is provided with a coil 40 at opposite the side of the suspension 34 through the pivot 32 and rotated by a voice coil motor (VCM) 42 cooperating with the coil 40 (the coil and the VCM as a whole constitute an actuator). The rotation of the arm 30 causes the magnetic head 22 to be positioned over the magnetic disk 36 in the radial direction so that reading, writing, or erasing of the magnetic information on both surfaces of the magnetic disk 22 becomes possible. To the outer surface (base undersurface) of the base 12 is attached a circuit substrate (card) 44 through which power and signals can be transmitted and received between the spindle motor 18 and the carriage 28. In the figure, reference numeral 46 denotes a flexible cable for connecting the carriage 28 and the card 44.

Figure 3:
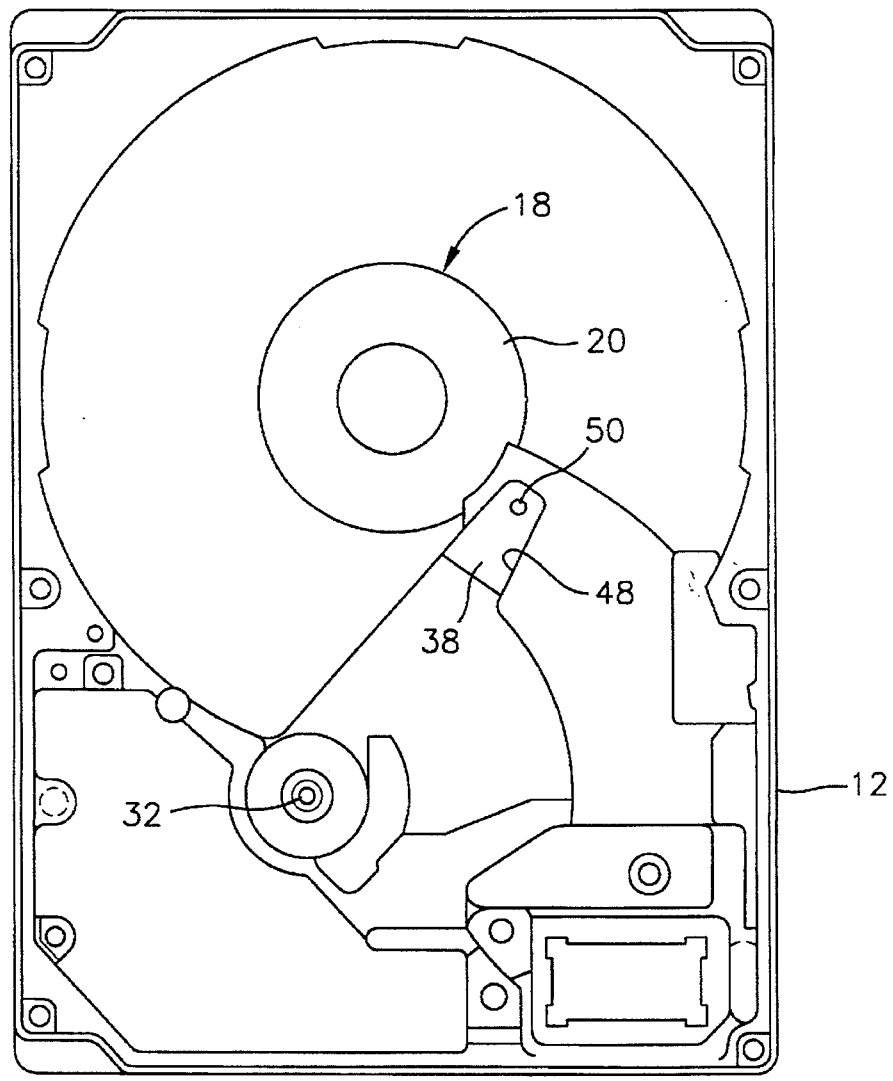
FIG. 3 is a plan view showing the base of the hard disk drive in the first embodiment.

As shown in FIGS. 1 and 3, the base 12 is provided at the parking zone 38 with a groove 48 opposed to the lowermost suspension 34. The groove 48 is provided with a pin projection 50 constituting a limiter section which projects toward the suspension 34. The groove 48 extends substantially from the proximal end of the suspension 34 to the free end, and the pin projection 50 is positioned on the side opposed to the magnetic head 36 in the free end of the suspension 34. Also, the parking zone 38 of the cover 14 is provided with a pin projection 52 projecting toward the uppermost suspension 34. The pin projection 52 is positioned on the side opposed to the magnetic head 36 in the free end of the suspension 34.

According to the above-described construction, the magnetic disk 22 is driven to rotate by the spindle motor 18 and, during normal rotation, the magnetic head 36 floats off the magnetic disk 22 without contacting the magnetic disk 22 and is positioned in the floating state so that reading and the like of the magnetic information can be performed. When the magnetic disk 22 is stopped, the magnetic head 36 is retracted to the parking zone 38 which may be contacted by the magnetic head 36.

Figure 4:
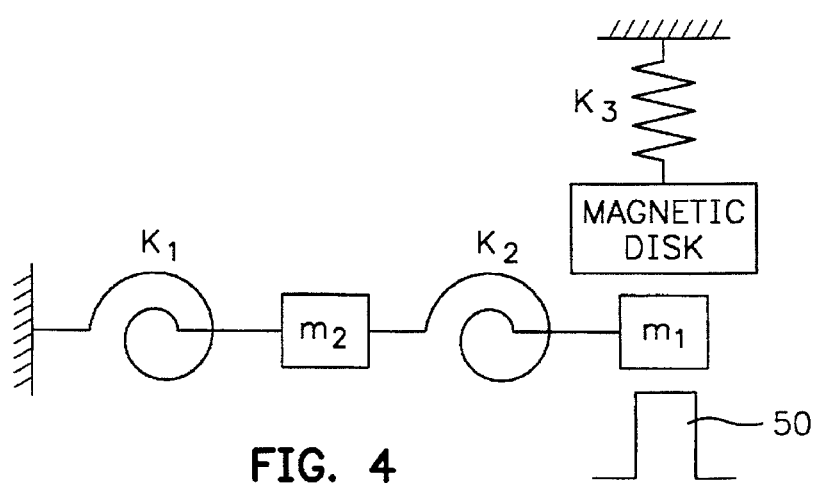
FIG. 4 is a schematic view showing the vibration system of the suspension in the first embodiment.
Figure 5:
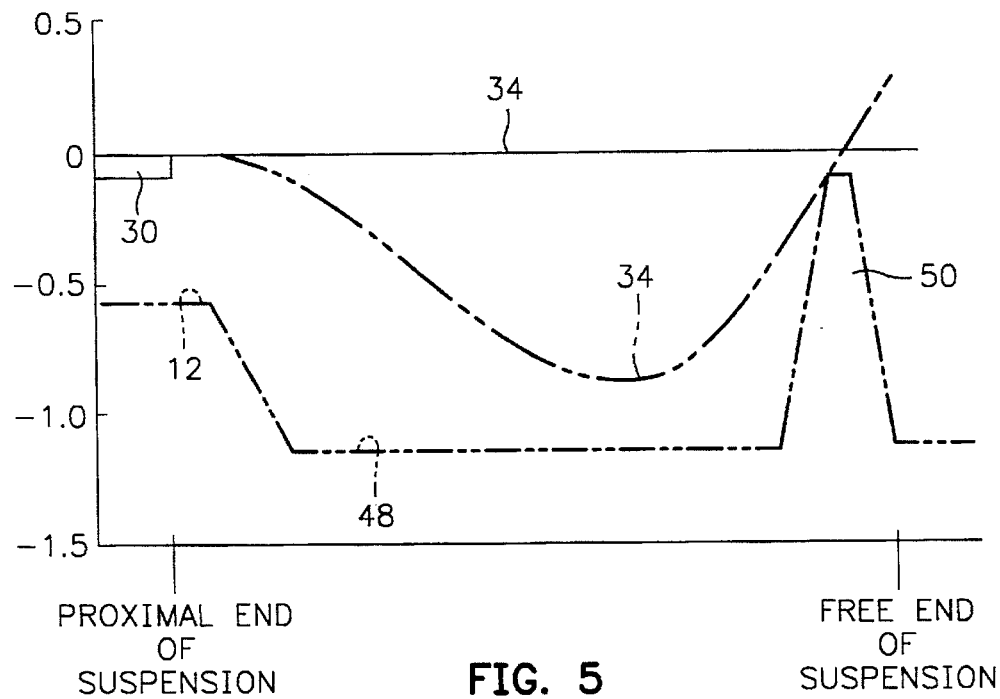
FIG. 5 is a diagram showing the displacement of the suspension based on the vibration system of FIG. 4 in the first embodiment.
Figure 9:
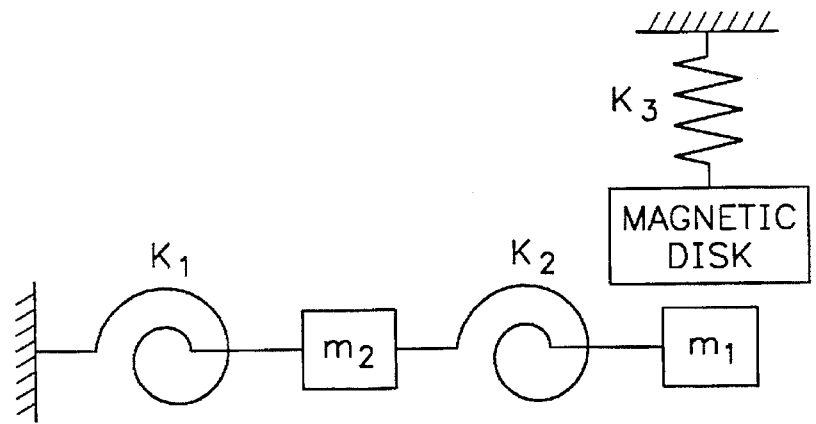
FIG. 9 is a schematic view showing vibration according to a prior-art suspension.

When the HDD is subjected to shock with the magnetic head 36 retracted to the parking zone 38, the suspension 34 swings. If it is assumed that the lowermost suspension 34 swings, the free end of the suspension 34 will be brought into contact with the pin projection 50, and further displacement toward the base 12 will be limited. The vibration system of the suspension 34 that further swings in this condition becomes as shown in FIG. 4 in which the pin projection 50 is provided in the vibration system of FIG. 9. According to this vibration system, the suspension 34 is displaced from the position indicated by the solid line to the position indicated by the double-dotted dashed line when subjected, for example, to an acceleration equivalent to 500 G, as shown in FIG. 5. In the FIG. 5, the single-dotted dashed line denotes the contours of the base 12, the groove 48, and the pin projection 50. The suspension 34 which further swings with the free end of the suspension 34 contacted the pin projection 50 exhibits not a swing in primary mode (cantilever support mode) but a swing in secondary mode (two-point support mode). The maximum displacement of the suspension 34 occurs at the longitudinal intermediate portion of the suspension 34. The intermediate portion that is displaced is made to go into the groove 48 so that the contact of the intermediate portion of the suspension 34 with the upper surface of the base 12 is impeded by the groove 48.

If there is no groove, the intermediate portion of the suspension will crash against the base and a greater acceleration will occur in the magnetic head because of the reaction force of the crash, so that the effect of the limiter section is to be reduced. This is prevented according to this embodiment. Also, the free end of the suspension 34 is brought into contact with the pin projection 50, and further displacement of the free end toward the base 12 is impeded, so the acceleration of the free end of the suspension 34 on which the magnetic head 36 is installed is suppressed. Therefore, damage to the magnetic head 36 and the magnetic disk 22 is prevented. It is preferable that the clearance between the free end of the suspension 34 and the pin projection 50 be as small as possible.

Figure 10:
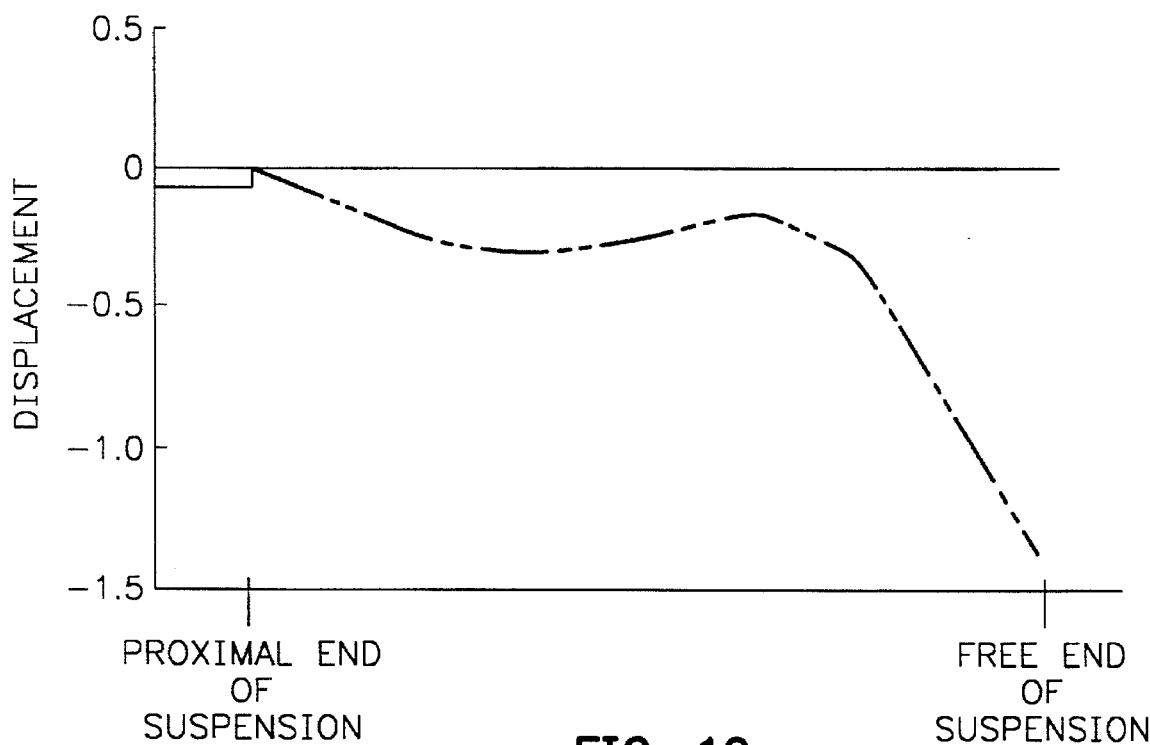
FIG. 10 is a graph showing the displacement of the suspension based on the vibration system of FIG. 9.
Figure 11:
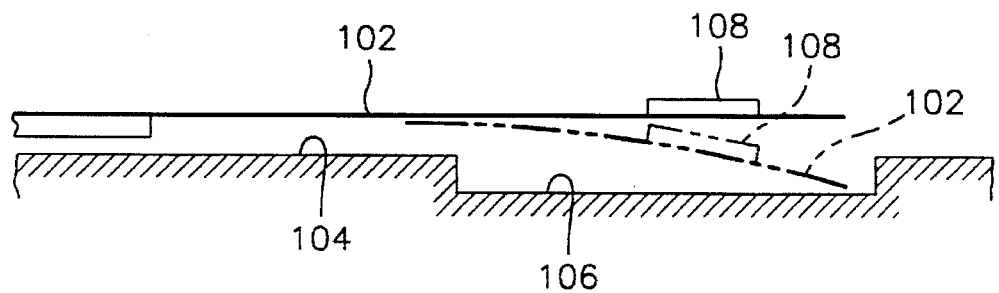
FIG. 11 is a diagram showing the swing of the prior art suspension.

Further, the maximum displacement (shown in FIG. 5), which occurs at the intermediate portion of the suspension 34 as the suspension swings when the free end of the suspension 34 is brought into contact with the pin projection 50 is smaller than the maximum displacement (shown in FIG. 10) which occurs at the free end of the suspension by the swing of the suspension (in cantilever support mode) produced when there is no pin projection, and therefore a shallow groove is sufficient. For the base 12 needing a suitable strength for installing the spindle motor 18 and supporting the carriage 28, this is effective in promoting the thinning of the HDD, while ensuring the strength of the base 12. Thus, the damage to the magnetic head 36 and the magnetic disk 22 can be eliminated by controlling the swing of the suspension 34 resulting from shock to the HDD, and, at the same time, the thinning of the HDD can also be ensured.

Figure 6A:
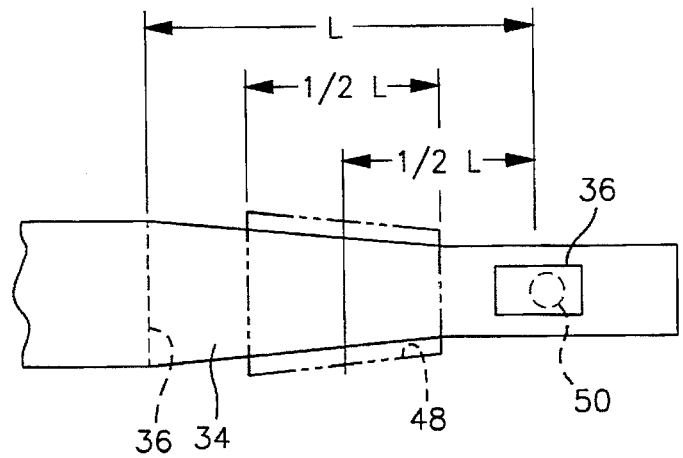
FIGS. 6A and 6B show the concrete relationship between the suspension in the parking zone and the base, in the first embodiment, FIG. 6(A) being a plan view and FIG. 6(B) being a longitudinal sectional view.
Figure 6B:
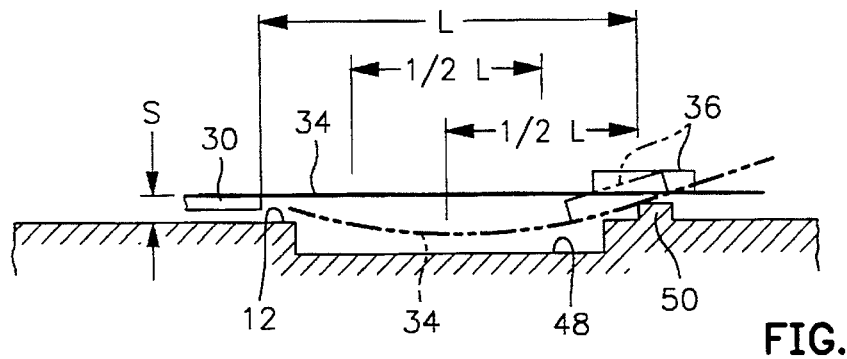

The groove 48 is not always formed between the proximal end and the free end of the suspension 34. For example, as shown in FIG. 6, in the case in which an acceleration equivalent to 500 G is applied, there may be formed a groove 48 having a length of more than ½ of effective length L of the suspension 34 between the proximal end of the suspension 34 and the pin projection 50 and to have at its center the central position between the proximal end of the suspension 34 and the pin projection 50. The portion of the suspension 34 that presents a greater displacement than clearance S between the suspension 34 in a stationary state and the base 12 is located at the position opposed to the groove 48 so that it can go into the groove 48. The portion of the suspension 34 that is not opposed to the groove 48 does not present a displacement greater than the clearance S and is by no means brought into contact with the base 12. The length, position, and depth of the groove depend upon the magnitude of the shock that an HDD can withstand and are thus set appropriately.

For the uppermost suspension 34, the free end of the suspension 34 contacts the pin projection 52, and further displacement of the free end toward the base 12 is impeded. The suspension 34 which further swings in this state becomes the swing of the above-described secondary mode and the intermediate portion presents the maximum displacement. As described above, since in the uppermost suspension 34 the magnetic disk 22 is pressed down and held on the hub 20 of the spindle motor 18 by the clamp 26, the clearance between the suspension 34 and the cover 14 is correspondingly made larger because of the existence of the clamp 26. While, for the lowermost suspension 34, the groove 40 is formed in the base 12, for the uppermost suspension 34, the contact of the intermediate portion of the suspension 34 with the cover 14 resulting from the displacement of the intermediate portion toward the base 12 will be impeded even if no such groove is provided, because the clearance between the suspension 34 and the cover 14 can be made larger.

It is to be noted that the pin projection 52 is not always formed in the cover 14. For example, the clamp 26 may be extended and the extended portion may be opposed to the suspension 34. As with the pin projection 50, the clearance between the pin projection 52 and the suspension 34 is also preferable to be as small as possible. Also, since the intermediate suspension 34 comprises two suspensions, the space that the suspension can deform is correspondingly largely ensured. Therefore, if the suspension swings in primary mode, the swing can be dealt with. Note that the pin projections 50 and 52 opposing the suspension 34 at the opposite side of the magnetic head 36 need not to be exactly aligned (overlapped) with the position at which the magnetic head 36 is installed, but it is preferable that the positions of the pin projections 50 and 52 opposed to the suspension 34 be aligned (overlapped) with the magnetic head 36 installation position.

Figure 7:
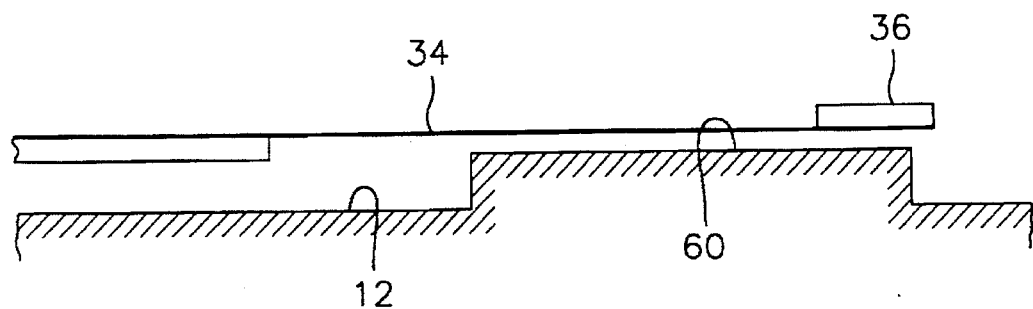
FIG. 7 is a longitudinal sectional view showing the parking zone of a second embodiment.

Other embodiments will next be described. In a second embodiment shown in FIG. 7, the limiter section is constituted by a projection 60 continuously formed between the intermediate portion and the free end of the suspension 34, and, in a third embodiment shown in FIG. 8, the limiter section is constituted by a pair of spaced projections 62 formed at the intermediate portion and the free end of the suspension 34. The other constitutions are the same as the first embodiment. In either of the second and third embodiments, in addition to the free end of the suspension 34 contacting the part of the limiter section and further displacement of the free end toward the base 12 being impeded, further displacement of the intermediate portion of the suspension 34 toward the base 12 is also impeded and, overall, the acceleration of the suspension 34 is suppressed. In such a case, without providing the groove 48 described in the first embodiment, damage to the magnetic head 36 and the magnetic head 22 can be prevented by controlling the swing of the suspension 34 resulting from shock and, at the same time, the thinning of the HDD can also be ensured.

Figure 8:
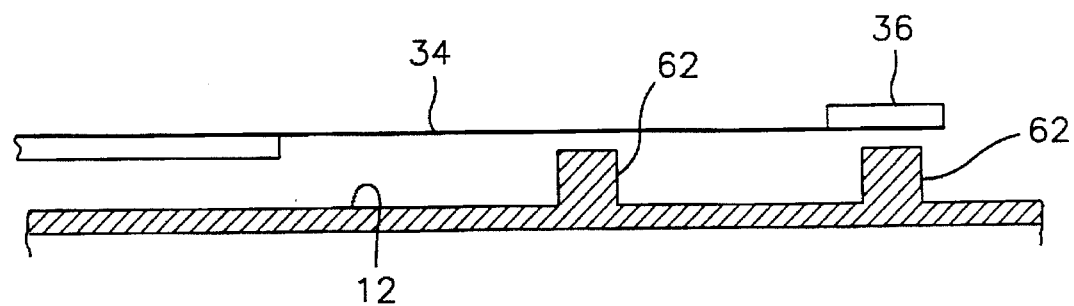
FIG. 8 is a longitudinal sectional view showing the parking zone of a third embodiment.

While, in the third embodiment in FIG. 8, one of a pair of pin projections 62 is located at the position corresponding to the central portion of the suspension and the other pin projection 62 is located at the position corresponding to the opposite side of the magnetic head 36, they need not be located exactly at these positions, although such a case is preferable. Further, it is preferable in the second and third embodiments that the clearance between the projections 60, 62 and the suspension 34 be as small as possible. The limiter section formed between the intermediate portion and the free end of the suspension 34 is also not limited to the second and third embodiments, but the suspension may be contacted at least at the opposite ends. For example, while, in the third embodiment, the limiter section has been constituted by a pair of pin projections, it may also be constituted by more than three pin projections. Further, the shape of the suspension is also not limited to the above-described embodiments. For example, the width-direction opposite sides of the suspension may be bent in the direction away from the magnetic disk to form ribs so that the suspension can have a rigidity for impeding excess deformation in the direction away from the magnetic disk.

According to the shock-resistant structure for a magnetic disk drive of the present invention, damage to the magnetic head and the magnetic disk can be eliminated by controlling the swing of the suspension resulting from the shock that the magnetic disk drive is subjected to and, at the same time, thinning of the magnetic disk drive can also be ensured.

Although the invention has been described in terms of the specific embodiments, the inventors contemplate modifications and substitution to various components of the invention which would occur to one of ordinary skill in the art, and therefore, would be in the scope of the invention, which is to be limited only by the claims which follow.

We claim:

1. A shock-resistant magnetic disk drive comprising:
    an enclosure including a base closed by a cover, a magnetic disk which is driven to rotate by a motor provided on said base being enclosed in said enclosure;
    a carriage provided in said enclosure, the carriage including a support section freely movable and supported on said base, a suspension whose proximal end is cantilevered by said support section so as to be elastically deformable and which extends between said base and said magnetic disk, and a magnetic head which is provided on the free end of said suspension and urged toward said magnetic disk by the elasticity of said suspension and positioned by the movement of said support section so that it can perform reading of magnetic information;
    a limiter section formed in a parking zone to which said magnetic head is retracted and extending toward said suspension, and when said magnetic head is subjected to shock in said parking zone, said free end of said suspension displaced by a swing of said suspension resulting from said shock being brought into contact with said limiter section, and further displacement of said free end toward said base being impeded by said limiter section;
    a groove formed in said parking zone, a longitudinal intermediate portion of said suspension which is displaced toward said base when said free end of said suspension contacts said limiter by said swing of said suspension resulting from said shock being prevented from being brought into contact with said base by said groove; and
    said groove being located entirely between said limiter section and said support section.

2. A shock protected magnetic disk drive comprising:
    a housing which includes a base plate and a cover plate;

a motor with a spindle mounted on the base plate and a magnetic disk mounted on the spindle for rotation by said motor;

an actuator mounted to the base plate and having a carriage arm which extends toward the magnetic disk;

the actuator moving the carriage arm to a parking zone with respect to the magnetic disk when the magnetic disk is not rotated;

a suspension having a secured end and a free end, the secured end being secured to said carriage arm and the free end supporting a magnetic head slider between the base plate and a surface of the magnetic disk;

the base plate having at least one projection located in said parking zone and opposite the slider for limiting movement of the slider away from the surface of the disk and a recess which is adjacent said at least one projection;

the projection and the recess being located substantially entirely within said parking zone; and the base plate being recessed only between said projection and said secured end of the suspension so that an intermediate portion of the suspension between the secured and free ends of the suspension can recess therein upon being subjected to shock loading.

3. A disk drive as claimed in claim 2 including:

a second suspension having a secured end and a free end, the secured end being secured to said carriage arm and the free end supporting a second magnetic head slider between the cover plate and another surface of the magnetic disk;

limiting stop means mounted in the housing and located between the cover plate and the second slider for limiting movement of the second slider away from said another surface of the disk; and said limiting stop means being located substantially entirely within said parking zone.

4. A disk drive as claimed in claim 3 wherein said limiting stop means includes the cover plate having at least one projection located opposite the second slider for limiting movement of the second slider away from said another surface of the disk.

5. A disk drive as claimed in claim 2 wherein the recess extends a distance which is less than the distance between said projection and said secured end of the suspension and is substantially centered between the projection and the secured end of the suspension.

6. A disk drive as claimed in claim 5 wherein the recess extends a distance which is substantially one half the distance between said projection and said secured end of the suspension.

7. A disk drive as claimed in claim 6 including:

a second suspension having a secured end and a free end, the secured end being secured to said carriage arm and the free end supporting a second magnetic head slider between the cover plate and another surface of the magnetic disk;

limiting stop means mounted in the housing and located between the cover plate and the second slider for limiting movement of the second slider away from said another surface of the disk; and said limiting stop means being located substantially entirely within said parking zone.

8. A disk drive as claimed in claim 7 wherein said limiting stop means includes the cover plate having at least one projection located opposite the second slider for limiting movement of the second slider away from said another surface of the disk.

9. A disk drive as claimed in claim 2 including:

a second suspension having a secured end and a free end, the secured end being secured to said carriage arm and the free end supporting a second magnetic head slider between the cover plate and another surface of the magnetic disk; and limiting stop means mounted in the housing and located between the cover plate and the second slider for limiting movement of the second slider away from said another surface of the disk.

10. A disk drive as claimed in claim 9 wherein said limiting stop means includes the cover plate having at least one projection located opposite the second slider for limiting movement of the second slider away from said another surface of the disk.

11. A disk drive as claimed in claim 10 including:

the actuator moving the carriage arm to two parking zones with respect to two surfaces of one or more magnetic disks when the one or more magnetic disks is/are not rotated; and the projection of the base plate being located substantially within one of said parking zones and the projection of the cover plate being located substantially within the other of said parking zones.

12. A disk drive as claimed in claim 2 wherein a second projection extends from the base plate substantially opposite a midportion of the suspension, the midportion being located substantially midway between the slider and the secured end of the suspension.

13. A disk drive as claimed in claim 12, including:

a second suspension having a secured end and a free end, the secured end being secured to said carriage arm and the free end supporting a second magnetic head slider between the cover plate and another surface of the magnetic disk; and limiting stop means mounted in the housing and located between the cover plate and the second slider for limiting movement of the second slider away from said another surface of the disk.

14. A disk drive as claimed in claim 13 wherein said limiting stop means includes the cover plate having at least one projection located opposite the second slider for limiting movement of the second slider away from said another surface of the disk.

15. A disk drive as claimed in claim 14 including:

the actuator moving the carriage arm to two parking zones with respect to two surfaces of one or more magnetic disks when the one or more magnetic disks is/are not rotated; and the projections of the base plate being located substantially within one of said parking zones and the projection of the cover plate being located substantially within the other of said parking zones.

16. A disk drive for limiting movement of a suspension comprising:

a base plate;

a magnetic disk rotatably mounted on the base plate;

an actuator arm rotatably mounted to the base plate;

a suspension having a secured end and a free end, the secured end being secured to the actuator arm and the free end supporting a magnetic head slider between the base plate and a surface of the magnetic disk;

at least one projection on the base plate positioned opposite said slider, for limiting movement of the slider away from a surface of the disk;

the base plate being recessed adjacent said projection for providing a space for receiving a portion of said suspension during shock loading;

the projection and recess being located substantially entirely within a parking zone of the slider, the parking zone being a location of the suspension when the magnetic disk is not rotated.

17. The disk drive as claimed in claim 16 wherein the recess extends a distance which is less than the distance between said projection and said secured end of the suspension and is centered between the projection and the secured end of the suspension.

18. The disk drive as claimed in claim 17 wherein the recess is adapted to extend a distance which is substantially one half the distance between said projection and said secured end of the suspension.

* * * * *